3,367,887
SOLID CATALYSTS
Walter L. Haden, Jr., Metuchen, and Frank J. Dzierzanowski, Somerset, N.J., assignors, by mesne assignments, to Engelhard Minerals & Chemicals Corporation, Menlo Park, Edison, N.J., a corporation of Delaware
Continuation-in-part of applications Ser. No. 343,952, Feb. 11, 1964, and Ser. No. 389,188, Aug. 12, 1964. This application Feb. 25, 1966, Ser. No. 530,064
10 Claims. (Cl. 252—455)

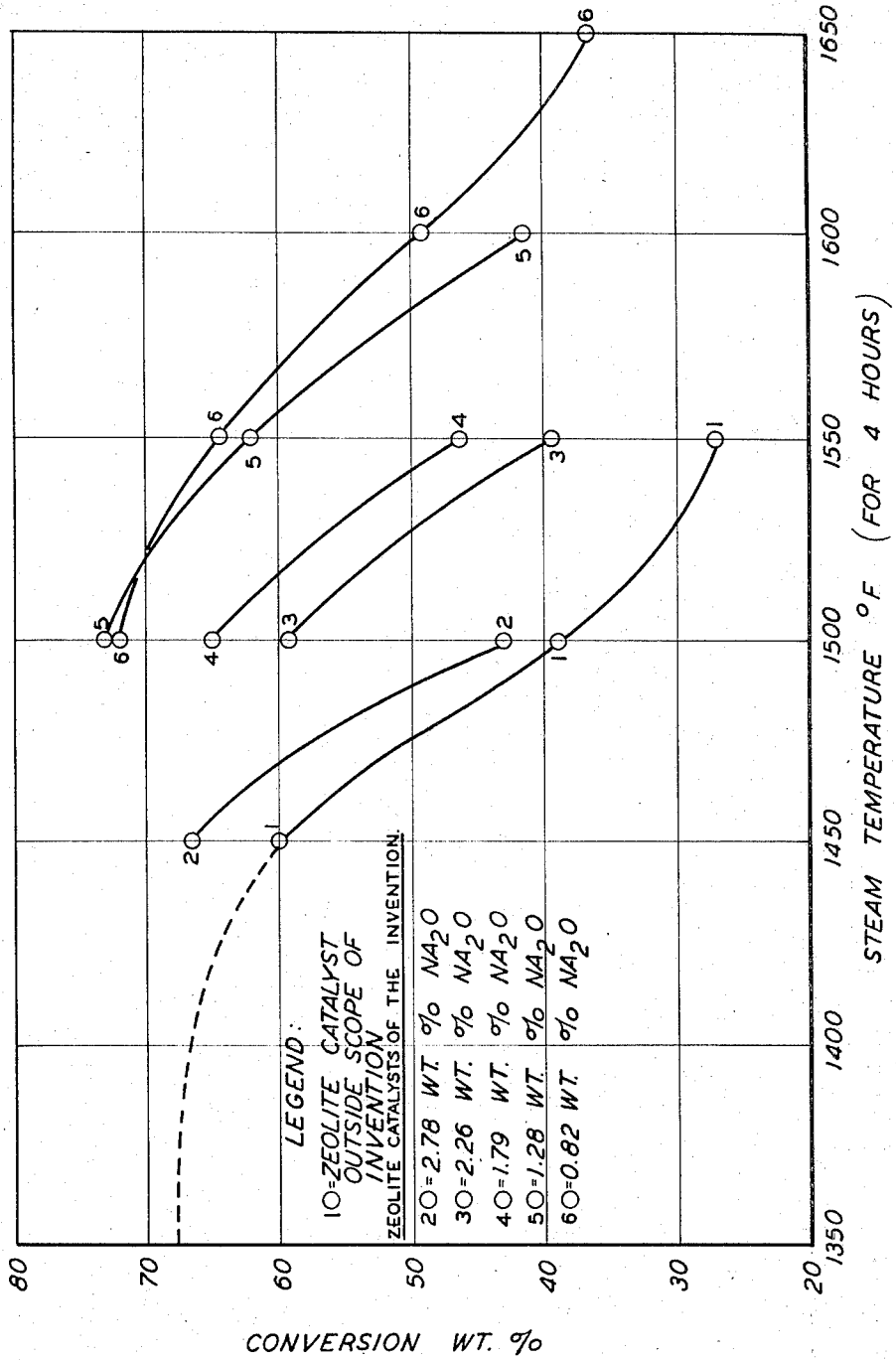

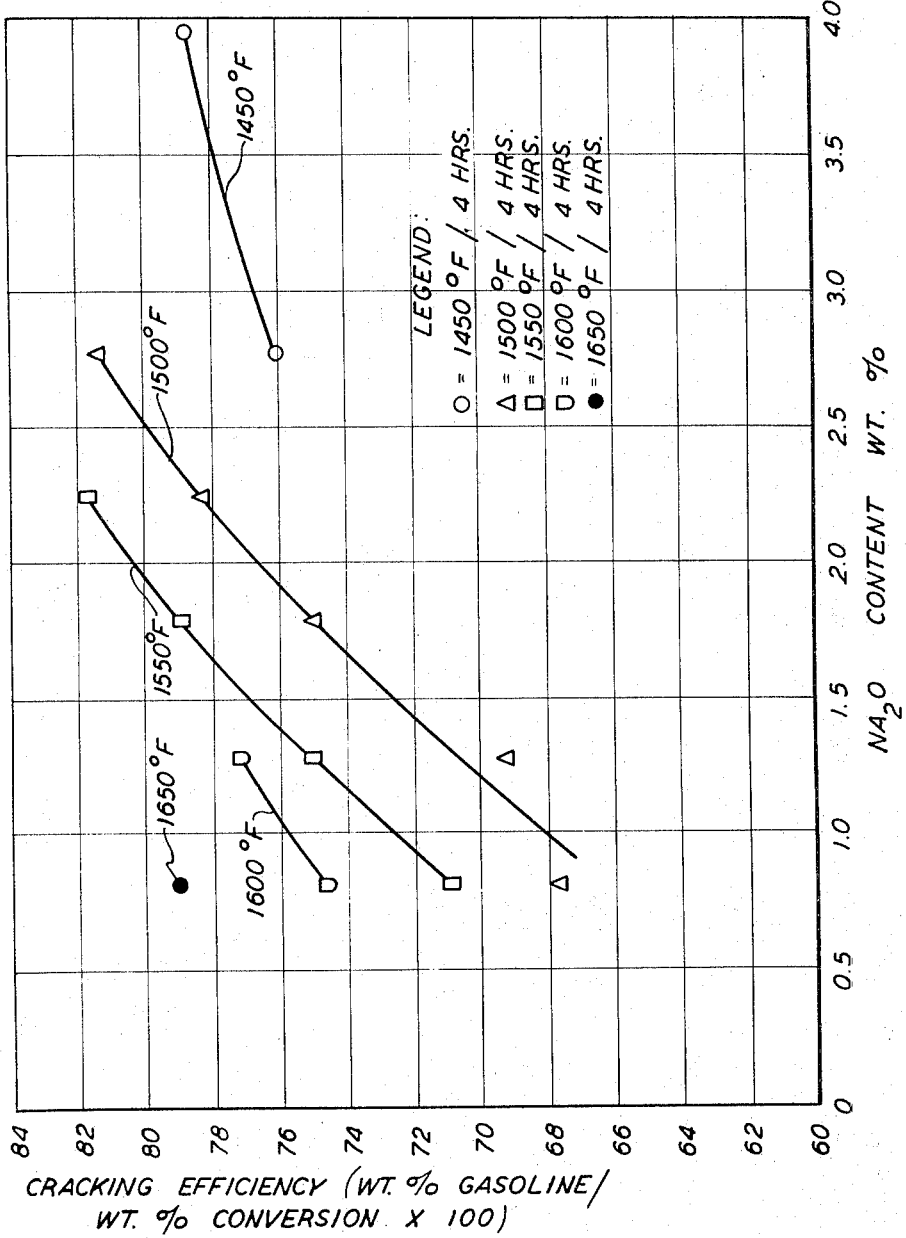

ABSTRACT OF THE DISCLOSURE

Solid zeolitic molecular sieve catalysts are obtained by ion-exchanging and heat-treating a base material which is a composite of a high silica-to-alumina form of hydrated sodium zeolite Y and raw kaolin clay. The base material contains 4 percent to 10 percent $Na_2O$ (on a volatile-free weight basis) and the balance substantially $Al_2O_3$ and $SiO_2$ in a silica-to-alumina weight ratio within the range of 1.1–1.3 to 1. The catalysts obtained by ion-exchanging the base material have $Na_2O$ contents less than about 2.5 percent and the same silica-to-alumina ratio as the base material from which they were obtained.

This application is a continuation-in-part of our earlier filed applications, Ser. No. 343,952, filed Feb. 11, 1964, and now abandoned, and Ser. No. 389,188, filed Aug. 12, 1964.

This invention relates to catalysts and is especially directed to catalysts adapted for use in the cracking of oil feedstocks to produce gasoline.

An object of this invention is to provide a mechanically stable composite zeolitic solid base material capable of being converted to catalysts of desired properties by ion-exchange and thermal activation.

A principal object of this invention is to produce novel high alumina zeolitic cracking catalysts characterized by exceptionally high catalytic activity and selectivity to the production of gasoline, combined with outstanding stability in the presence of high temperature steam.

Another object is to produce relatively high bulk density zeolitic cracking catalysts which, because of their high density, enable the seal legs in certain catalyst cracking units to seal against higher pressures than catalysts of lower density and also permit the use of higher vapor velocities through catalyst beds.

A specific object of the invention is provision of a highly active and selective zeolitic cracking catalyst that exhibits remarkable thermal stability in the presence of steam.

Another object is to produce mechanically strong composite zeolitic molecular sieve cracking catalysts in which the sieve component is stabilized against the normally degrading effect of steam during use or regeneration by an aluminum silicate component.

Further objects and features will be apparent from the description of the invention which follows.

We have developed zeolitic molecular sieve composites that are characterized by remarkable mechanical strength and high density. When ion-exchanged with suitable cations and activated, these composites possess exceptionally high selectivity and activity in the cracking of gas oil feeds to produce gasoline. The catalysts, which have a very high alumina content in comparison with commercial zeolitic molecular sieve catalysts, represent a marked advance in the art because of their superior mechanical and thermal stability, high density and low cost.

Briefly stated, the composite catalyst-base mixture of this invention is in the form of mechanically strong particles containing microcrystalline zeolitic molecular sieve having substantially the X-ray diffraction pattern of sodium zeolite Y, preferably a high silica-to-alumina molar ratio form of sodium zeolite Y having a silica-to-alumina molar ratio of at least 4, strongly interbonded with microcrystalline kaolin clay, the base material containing, on a volatile free weight basis, from 4 percent to 10 percent, preferably 5 percent to 7 percent $Na_2O$, and the balance substantially $Al_2O_3$ and $SiO_2$ in a silica-to-alumina weight ratio within the range of 1.1–1.3 to 1. It is significant to note that the silica-to-alumina molar ratio of the zeolitic constituent is much higher than that of the composite base material, which has a silica-to-alumina molar ratio of about 2.

Volatile free weight is determined by heating a material to essentially constant weight at 1800° F.

As shown in the illustrative examples, the catalyst-base material of the invention can be obtained by hydrothermal treatment without dehydration of preformed masses of sodium hydroxide solution, calcined amorphous high purity kaolin clays and high purity raw crystalline kaolin clay, in a manner such that the zeolitic molecular sieve is produced by reaction of the caustic principally with the calcined amorphous clays in situ in the presence of the raw crystalline kaolin clay. The term "kaolin" clay as used herein encompasses clays, the predominating mineral constituent of which can be kaolinite, dickite, nacrite or halloysite. The aforementioned minerals are hydrous crystalline aluminum silicates of the formula $$Al_2O_3 \cdot 2SiO_2 \cdot xH_2O$$

wherein $x$ is usually 2. In producing catalysts, the following ionizable compounds are representative of compounds which can be used to replace the alkali metal of the catalyst-base material of the invention: salts of ammonium, barium, calcium, magnesium, manganese, vanadium, chromium, cerium, cobalt, nickel, iron, zinc, aluminum, rare earths (lanthanum, praesodymium, neodymium and samarium), hydrogen and mixtures of the foregoing. The base material can also be processed to obtain composite active contact materials which contain elemental metals.

An outstanding feature of the composites is that they possess remarkable mechanical strength even before they are dehydrated by thermal treatment. In fact, the crystallized particles are much harder and more resistant to attrition than particles of similar size and shape that are composed of high purity kaolin clay per se. The composite particles are significantly harder and more resistant to attrition than particles of kaolin clay which have been hardened at temperaure levels used in processing the composites.

This invention is directed especially to a cracking catalyst which is obtained by ion-exchanging said composite base material with ammonium ions, whereby sodium ions are replaced with ammonium ions, and thermally activating the ion-exchanged particles. The cracking catalyst is a high alumina content zeolitic composition analyzing (volatile free basis) $Na_2O$ in amount within the range of 0.1 percent to 3 percent by weight and the balance substantially $SiO_2$ and $Al_2O_3$ in a weight ratio within the range of 1.1 to 1.3 parts by weight $SiO_2$ per part by weight $Al_2O_3$. The preferred catalysts of the invention contain at least 0.4 percent $Na_2O$, since the production of catalysts with lower $Na_2O$ content requires large amounts of exchanging chemicals and long exchanging time. Catalysts of the invention containing more than 2.5 percent $Na_2O$ are not as steam stable as catalysts having a lower sodium content. For optimum selectivity, the higher range of sodium content is preferred. For optimum stability, the lower range of sodium content is preferred. Our catalyst may contain (and preferably does contain) more sodium than most prior art zeolitic catalysts. Representative catalysts of the invention have the following chemical analyses, on a volatile free weight basis:

| | Percent |
|---|---|
| $Na_2O$ | 0.4 to 2.5 |
| $Fe_2O_3$ | <0.5 |
| $Al_2O_3$ | 43 to 46 |
| $SiO_2$ | 51 to 55 |
| $TiO_2$ and alkaline earth oxides | <2.0 |
| | 100 |

Before activation, the catalyst of the invention is characterized by possessing an X-ray diffraction pattern containing peaks characteristic of crystalline kaolin clay and peaks characteristic of ammonium zeolite Y, as described in U.S. Patent 3,130,006 to Jule A. Rabo et al. (The excange of sodium ions in the composite-base material with ammonium ions may affect slightly the apparent silica-to-alumina ratio of the zeolite, as calculated from the X-ray diffraction pattern.) After thermal activation, whereby the composite is dehydrated and ammonia is eliminated, the catalyst is characterized by possessing X-ray diffraction peaks substantially as follows.

| "$d$" Spacing, A.: | Line intensity |
|---|---|
| 14 | Very strong. |
| 8.6 | Medium. |
| 7.3 | Do. |
| 5.6 | Strong. |
| 3.7 | Medium. |

From the brief description of the composition of the catalysts of this invention, it is apparent that our catalysts differ in composition from prior art aluminosilicate gel and acid-activated clay catalysts. With the exception of certain acid-activated kaolin clay and mixed gel-clay cracking catalysts, prior art catalysts usually contain a maximum of about 30 percent $Al_2O_3$. Our catalysts, however, differ in chemical composition from the high alumina acid-activated kaolin clay and mixed gel-clay catalysts, which have a similar silica-to-alumina ratio since sodium, which is an essential ingredient of our catalysts, is a poison when present in the other high-alumina content catalysts. Further, our high alumina content cataysts produce in many cases 25 percent more gasoline than the acid-activated clay catalysts and can operate with this efficiency at conversion levels not practical with acid-activated clay catalysts. In addition to possessing outstanding selectivity and activity, catalysts of the invention are more stable to steam than commercial cracking catalysts, including pelleted zeolitic molecular sieve catalysts. Our catalyst composites maintain their activity and selectivity when steamed under conditions which would destroy or substantially impair the pure zeolite. Further, our catalysts operate with high activity and selectivity when steamed under conditions which cause other zeolitic catalysts to lose their activity and selectivity. Another noteworthy feature of the catalysts is that they operate with the desirable selectivity characteristics of the fresh catalyst even when the catalytic activity decreases during service. Thus, our catalysts do not acquire the cracking characteristics of the matrix. This, of course, is not true of prior art composite molecular sieve zeolite catalysts that contain catalytically active gel matrices.

Typical physical characteristics of our catalysts (activated) are as follows:

| | |
|---|---|
| Bulk density, kg./l. | 0.8 to 1.0 |
| Surface area (B.E.T.), m.²/g. | 75 to 150 |
| Hardness (cylindrical 4/8 mesh pelleted form)—4-ball hardness, percent | 95 to 98 |

By way of comparison, the zeolitic molecular sieve catalyst composites described in U.S. 3,140,249 to Charles V. Plank et al. are lighter, having bulk densities within the range of 0.5 to 0.6 kg./l. and have high surface areas, i.e., in excess of 200 m.²/g. Because of their high density, catalysts of the invention enable seal legs in catalyst cracking units to seal against higher pressures and permit the use of higher vapor velocities through catalyst beds.

As mentioned, in producing our catalyst-base material the ingredients of the reaction mixture are selected to result in the crystallization of composites containing crystalline kaolin clay, e.g., kaolinite, and also a crystalline material which has the X-ray diffraction pattern of sodium zeolite Y having a silica-to-alumina molar ratio of at least 3.5, preferably 4.0 to 4.8. Recommended is the use of 28 parts by weight raw (uncalcined) kaolin clay, 17½ parts by weight of sodium hydroxide solution of 14 percent to 18 percent concentration, 2 parts by weight metakaolin (anhydrous amorphous kaolin clay calcined at a temperature below which the exotherm takes place) and 12 parts by weight of anhydrous amorphous kaolin clay that has been calcined at a temperature such that the clay has undergone (passed through) the characteristic exotherm after dehydration is substantially completed. A chemical balance indicates that the crystallized product obtained from such reaction mixture contains small amounts of one or more amorphous nonzeolitic components having a silica-to-alumina molar ratio less than 2. The method for forming the particles will depend upon the size and the shape of the catalyst particles since the size and shape of the reactant masses are retained substantially in the finished product. For example, to produce catalyst in the form of 4/8 mesh (Tyler) cylindrical pellets for moving or fixed bed catalytic operations, the reaction masses can be in the form of extruded pellets. Spray drying can be used to form 100/325 mesh (Tyler) microspheres for fluid bed operations. The sodium hydroxide can be incorporated with the clays before the clays are shaped into particles or all or a part of the caustic can be incorporated by soaking or impregnating preformed particles. Small amounts of sodium silicate can be used in manufacturing the catalyst-base material.

As a result of the hydrothermal treatment, without dehydration, as illustrated in the accompanying examples, some of the constituents of the particles react and form a material having substantially the X-ray diffraction pattern of sodium zeolite Y. The crystallization results in a marked hardening of the particles and a remarkably firm bond is established between the constituents in the particles. The crystallization of the zeolite in direct contact with the crystalline kaolin clay is essential to the development of particle hardness adequate for usual catalyst use. In order to develop adequate hardness, the crystallized particles should contain at least about 15 percent by weight (dry weight basis) crystalline zeolite (as estimated by X-ray diffraction). If desired, particles containing 50 percent zeolite (as estimated by X-ray) can be produced. When appreciably more than 50 percent zeolite is present, the catalyst may not possess the desired steam stability. We prefer to formulate the reaction masses and carry out the reaction and crystallization under conditions such that the particles contain 15 percent to 40 percent zeolite (as determined by X-ray diffraction). Composites that contain this quantity of zeolite have a $Na_2O$ content within the range of 5 percent to 7 percent, on a volatile free weight basis. During activation and use, however, the amount of crystalline zeolite (as determined by X-ray) may be reduced substantially without impairing the hardness or activity and selectivity of the catalyst. The crystallized particles are exchanged with ammonium salt to replace sodium ions with ammonium ions until the particles contain the desired calculated sodium oxide content. At this point the particles are hydrated. During subsequent thermal activation, which may be before or during use, the ammonium content is eliminated by the formation and evolution of ammonia gas.

As mentioned, the Na₂O content of the catalyst affects the activity and selectivity of the catalyst, especially the volume of gasoline produced at a given conversion level. Catalysts containing in excess of 1 percent Na₂O normally result in more gasoline at a given conversion level than similar catalysts containing less than 1 percent Na₂O. However, catalysts containing more than 2.6 percent Na₂O may not possess the desired thermal stability.

To activate the ion-exchanged masses and adjust the activity to a desired level, the masses can be steamed at about 1000° F. to about 1600° F. with 100 percent steam for two to four hours. This steaming also dehydrates the masses and hardens them further.

The masses do not need to be dried before steaming. As mentioned, it is also within the scope of the invention to activate the catalyst in a cracking unit.

powder diffraction patterns of products the criterion set forth in Table III of a publication by Donald C. Freeman, Jr. entitled "Electrical Conductivity of Synthetic Crystalline Zeolites," Journal of Chemical Physics, vol. 35, No. 3, September 1961. Table III in said publication correlates until cell dimension with $SiO_2/Al_2O_3$ ratio. The silica-to-alumina molar ratio of zeolite Y products was determined from the unit cell dimensions derived from X-ray diffraction patterns.

In estimating percentage of zeolite, a commercial sample of high purity sodium zeolite Y was used as a reference. Percentage zeolite was estimated by comparing the intensities of characteristic peaks of samples with corresponding peaks of the sample of high purity zeolite.

The following kaolin clays were used in the preparation described in the examples.

| Physical Characteristics | Satintone #1 | Satintone #2 | Min-Chem Specia |
|---|---|---|---|
| Specific gravity | 2.63 | 2.50 | 2.58 |
| Moisture, maximum wt. percent | 1.0 | 1.0 | 1.0 |
| Wt. percent +325 mesh (wet screen) | 0.5 | 0.5 | 0.5 |
| Average particle size, microns | 2.0 | 4.5 | 3.5 |
| pH | 5.8–6.3 | 5.8–6.3 | 3.8–5.0 |
| Typical chemical analysis (moisture-free weight basis): | | | |
|   Ignition loss at 1,800° F., percent | 0.5 | 0.9 | 13.8 |
|   Silica, percent | 52.3 | 52.1 | 45.4 |
|   Alumina, percent | 44.6 | 44.4 | 38.8 |
|   Iron oxide | 0.4 | 0.4 | 0.3 |
|   Titanium dioxide, percent | 2.0 | 2.0 | 1.5 |
| Calcination Treatment | Calcined Abobe Exotherm | Calcined Below Exotherm | Uncalcined |
| Composition | Amorphous | Amorphous (metakaolin) | Crystalline (kaolinite) |

While the high alumina-zeolitic catalyst of this invention can be prepared by crystallizing a material having the X-ray diffraction pattern of sodium zeolite Y by reaction of sodium hydroxide solution and calcined kaolin clay in the presence of raw hydrated kaolin clay which, for the most part, does not enter into the reaction, comparable catalysts are not obtained by binding pre-precipitated zeolite Y of suitable silica-to-alumina ratio with raw kaolin clay. It has been found that particles obtained by the latter procedure are friable and do not possess the mechanical strength required of catalysts. By way of illustration, when the crystallization occurs in situ, pelleted extruded particles containing about 20 percent zeolite (by X-ray) have a hardness of about 95 percent when tested by the hardness test described hereinafter. In contrast, when a similar amount of ion-exchanged zeolite Y is mixed with kaolinite and the mixture moistened, extruded and dried, relatively soft particles having a hardness of only about 80 percent are obtained. Further, composites made by mixing preformed zeolite with kaolin clay are generally lower in alumina content than catalyst particles of this invention since zeolite Y has a substantially higher silica-to-alumina ratio than the overall silica-to-alumina ratio in our catalyst particles.

This invention and its features will be understood more fully by the following examples.

All X-ray diffraction results referred to in the examples were obtained from random powder patterns using the K-alpha doublet of copper as the source of X-radiation, a receiving slit width of 0.006″, a Norelco specimen holder having a sample area of 0.812″ x 0.408″, a scintillation counter with pulse height analyzer, a scanning rate of 4° per minute, a time constant of 2 seconds, a scanning direction increasing from 2° to 90° and a strip chart pen recorder. Specimens were equilibrated at 25° C. and 40 percent to 50 percent relative humidity for at least eighteen hours prior to X-raying. Peak heights (counts per second, or "c./s." and positions were recorded on a strip chart. In view of the similarity between the diffraction patterns of zeolites X and Y, each of which has a characteristic maximum of 6.2° 2θ, zeolite X was distinguished from zeolite Y by applying to X-ray

Example I

In accordance with this invention a remarkable steam stable zeolite cracking catalyst possessing outstanding thermal stability and activity was prepared as follows.

3887 grams of Satintone #1 and 648 grams Satintone #2 were slowly mixed with 4000 ml. of 16 percent NaOH solution (weight basis). The mixing was carried out with a glass rod and was continued until the mixture had an apparently uniform consistency. 9085 grams Min-Chem Special was charged to a double-screw pug mill. To the charge in the pug mill, the mixture of Satintones and alkali solution was added. 500 ml. of 16 percent NaOH solution was used to rinse the pan that contained the slurry and, after being used to rinse the pan, the caustic was added to the pug mill. To make the mix in the pug mill extrudable, another 350 ml. of 16 percent NaOH solution was added so that the total weight of 16 percent NaOH solution was 5674 grams. The batch was pugged for ten minutes after the final addition of caustic solution. The temperature of the charge in the pugger was 88° F. at the end of the pugging. The mixture was extruded under vacuum in a worm-type extruder having 0.17″ diameter holes and the extrudate was cut into pellets about 0.25″ long as they issued from the extruder. The extrusion was made while the charge in the extruder was under a vacuum ranging from 28.0″ to 28.8″ Hg. The extrudate temperature increased gradually from 90° F. at the beginning of the extrusion to 124° F. to 126° F. after ½ hour. Total extrusion time was 34 minutes and the power used was 11.97 k.w.h./ton.

The freshly extruded pellets were placed in ½ gallon glass jars with the pellets substantially filling the jars. The jars were sealed tightly and maintained at room temperature of about 75° F. for 24 hours. The jars with contents were then placed in an oven maintained at 200° F. and held in the oven for a 24 hour period.

Without being washed or dried, 800 to 900 gram batches of the pellets were exchanged at 180° F. ± 10° F. with 1 N $NH_4NO_3$ solution by continuous percolation of the aqueous solution through batches ot the pellets in exchange columns for about 48 hours. At the end of the exchanges, the Na₂O content of the effluent were typically about 0.027 percent (as determined with a pH meter using a sodium-specific electrode). The pH of the effluents was about 7.3. The $Na_2O$ contents of the exchanged pellets ranged from 0.44 percent to 0.78 percent (based on the volatile free pellet weight).

Portions of the exchanged pellets were steam stabilized in a tube furnace for four hours with 100 percent steam. In steaming one portion, steam at 1550° F. was used. The product was identified as "Catalyst A." Another portion was steamed at 1575° F. to produce "Catalyst B" and another at 1600° F. to produce "Catalyst C." To determine an upper limit of thermal stability, steaming was carried out at 1645° F. (Catalyst D.) After the steam treatment, the most significant physical properties of each catalyst were determined and catalytic properties were evaluated by the CAT-D method (described hereinafter). The experimental clay catalysts, containing 0.44 percent to 0.78 percent $Na_2O$ and analyzing about 45 percent $Al_2O_3$ with the balance being substantially all $SiO_2$, were compared to a Grade A hardness commercial pelleted acid-activated kaolin cracking catalyst of substantially the same silica-to-alumina ratio. The latter was obtained by pelletizing uncalcined kaolin clay with concentrated sulfuric acid, reacting the koalin clay with the sulfuric acid and, without washing out solubles, thermally desulfating the pellets under reducing conditions. Before testing the commercial high alumina content, acid-activated clay, it was calcined at 1050° F. in air for four hours. The results are summarized in table form.

In carrying out the ball mill hardness tests (BMH), 4/5 mesh (Tyler) test samples, previously calcined in a muffle furnace at 1050° F. and stored in desiccators, were poured into tared 100 cc. graduated cylinders to the 80 cc. mark, with gentle tapping to pack the particles. The weight of 80 cc. of the sample was determined. The 80 cc. portion of the sample was then placed into a stainless steel cylindrical container with four polished stainless steel ball bearings, each of $^{15}/_{16}''$ diameter. The container was closed tightly and it was then rotated about its longitudinal axis on a roller arrangement at about 80 r.p.m. for one hour. After rotation had ceased, the particles in the container were screened on a limiting sieve (a 6 mesh Tyler sieve) and the hardness calculated at the percentage of total sample weight represented by the fraction of the material retained on the limiting sieve.

The method for measuring air jet hardness (AJH) is described in U.S. 3,024,206 to James B. Duke, entitled, "Method for Producing Rounded Plastic Masses."

The "CAT-D" test is a modification of the "CAT-A" method described in "Laboratory Method for Determining the Activity of Cracking Catalysts," by J. Alexander and H. E. Shimp, page R537, National Petroleum News, Aug. 2, 1944. In carrying out the CAT-D test, a heavy gas oil feedstock was used and cracking was carried out at 900° F. with 10 percent steam and a liquid space rate of 1.0 (volume charge/volume of catalyst/hour) for a fifteen minute operation period.

duced about 17 percent more gasoline and about half as much coke at a somewhat higher conversion level than the commercial high activity clay catalyst. These data therefore show that the catalyst of the invention was much more selective. Data for steaming the catalyst of this invention at 1575° F. and 1600° F. indicate that the selectivity and activity of the catalyst was retained even after severe calcination, thus demonstrating the remarkable stability of the catalyst. Other commercially available zeolite catalysts tend to lose activity at these levels of steam treatment and, after being steamed at temperatures above 1500° F. tend to have relatively poor selectivity corresponding substantially to that of conventional silica-alumina gel catalysts. Data in the table show that while some deactivation of the catalyst of the invention occurred with 1645° F. steaming, the catalyst still produced more gasoline than the clay catalyst at a somewhat lower conversion level.

*Example II*

This example illustrates some of the effects of variation of sodium oxide content on catalysts of the invention and demonstrates the superior selectivity of the higher sodium oxide content catalysts. The example also illustrates the superiority of catalysts of the invention over commercial prior art zeolitic molecular sieve composites containing a silica-alumina gel matrix.

In a pilot plant operation using ingredients and proportions substantially as set forth in Example I, a pelleted catalyst-base material was crystallized containing 6.02 percent $Na_2O$ and the balance substantially $SiO_2$ and $Al_2O_3$ in a weight ratio of 1.17 to 1. The pellets were base-exchanged with 1 N ammonium nitrate solution in batch exchanges and portions of the pellets withdrawn after a desired number of exchanges were performed. In this way pellets were obtained containing 0.82 percent, 1.28 percent, 1.79 percent, 2.26 percent, 2.78 percent and 3.96 percent $Na_2O$ (on a volatile free pellet weight basis). X-ray diffraction patterns of the pellets before the exchange treatment indicated that they contained 20 percent sodium zeolite Y having a silica-to-alumina molar ratio of 4.28 to 1. In order to control conversion level and to study the effect of steaming conditions on activity and selectivity, portions of the exchanged pellets were calcined at 1450° F. in one atmosphere of steam for four hours, and evaluated for catalytic properties. Other portions of the pellets were steamed at 1500° F. for four hours, using one atmosphere steam pressure, and then evaluated. Still other portions of the exchanged pellets were steamed at 1600° F. or at 1650° F. for four hours. Some samples were resteamed for an additional four hours and re-evaluated. A competitive commercial high activity zeolitic molecular sieve catalyst was treated in a similar manner.

It was found that the pelleted catalyst containing 3.96 percent $Na_2O$ had excellent activity and selectivity when

PROPERTIES OF CATALYST DERIVED FROM KAOLIN CLAY

| Cat. No. | Steam Treatment, °F./hr. | Physical Properties | | | Cracking Properties | | | | | |
|---|---|---|---|---|---|---|---|---|---|---|
| | | B.D.[1] | Hardness BMH[2] | AJH[3] | Vol. Percent Gasoline | Wt. Percent Coke | Wt. Percent Gas | Gas Gravity | Wt. Percent Conversion | Kaolin Coke Factor |
| A | 1550/4 | 0.927 | 97.7 | 19.3 | 52.5 | 2.3 | 14.8 | 1.48 | 60.5 | 0.46 |
| B | 1575/4 | 0.936 | 96.1 | 21.3 | 50.5 | 1.7 | 12.4 | 1.46 | 55.8 | 0.43 |
| C | 1600/4 | 0.942 | 96.7 | 25.3 | 46.6 | 2.0 | 12.1 | 1.39 | 52.7 | 0.56 |
| D | 1645/4 | 0.964 | 95.8 | 15.6 | 38.6 | 1.4 | 8.2 | 1.28 | 41.3 | 0.69 |
| Commercial Clay Cracking Catalyst | None | 0.779 | 99.1 | 26.3 | 35.0 | 4.2 | 20.4 | 1.45 | 55.4 | 1.08 |

[1] Bulk density.  [2] Ball Mill Hardness.  [3] Air Jet Hardness.

The term "kaolin coke factor" used in presenting comparative catalytic data, refers to a value obtained by comparing coke make of the experimental catalyst to that of a commercial kaolin catalyst at the same conversion (extrapolated.)

The results in the table show that the catalyst of the invention after activation by steaming at 1550° F. prosteamed at 1350° F. When steamed at 1450° F. for four hours, it was substantially inactive and resulted in only 25 percent conversion of the feedstock. The catalyst containing 2.78 percent $Na_2O$ was still active and highly selective at 1450° F. steaming for four hours (66 percent conversion) but with repeated steaming at 1450° F. the catalyst lost its activity.

A comparison of the activity of composite catalysts of the invention containing 0.82 percent to 2.26 percent $Na_2O$ with the competitive zeolitic molecular sieve catalyst appears in FIGURE 1. This figure shows that catalysts of this invention maintained high activity levels in excess of 40 percent weight conversion when steamed under conditions which substantially deactivated the competitive zeolitic molecular sieve catalyst.

Cracking efficiencies of the catalysts were calculated by dividing the weight percentage gasoline by the weight percentage conversion and multiplying by 100. The competitive catalyst had calculated cracking efficiencies of 71.2 percent and 70.6 percent when steamed at 1450° F. and 1550° F., respectively. These values represent weight percentage conversions to gasoline of 43 percent and 19 percent at steaming temperatures of 1450° F. and 1550° F., respectively. As shown in FIGURE 2, catalysts of the invention containing 0.82 percent to 2.78 percent $Na_2O$ had much higher calculated cracking efficiencies than the competitive catalyst when activated at 1550° F. to 1650° F. For example, the catalysts containing more than 1.78 percent $Na_2O$ had exceptionally high cracking efficiencies of 75 percent to 78 percent when activated at 1450° F. to 1500° F. The catalysts containing 0.82 percent to 1.28 percent $Na_2O$ had cracking efficiencies of 60 percent to 69 percent when steamed at 1500° F. However, data in FIGURE 1 show that the latter catalysts operated at extremely high conversion levels (above 70 percent). Consequently, the overall gasoline production was excellent although the ratio of gasoline to conversion was less than when conversion was at much lower levels.

We claim:
1. A base material for catalyst manufacture in the form of coherent particles of a mixture of microcrystalline hydrated sodium zeolite Y having a silica-to-alumina ratio in excess of 4, as determined by X-ray diffraction, and a major amount of raw hydrated kaolin clay, said particles having a density of at least 0.8 kg./l. when dehydrated thermally, and analyzing, on a volatile free weight basis, from 4 percent to 10 percent $Na_2O$ and the balance substantially $SiO_2$ and $Al_2O_3$ in a weight ratio of 1.1 to 1.3 parts by weight $SiO_2$ per part by weight $Al_2O_3$.

2. The product of claim 1 which has a $Na_2O$ content within the range of 5 percent to 7 percent.

3. A composite material which is characterized by high catalytic activity, selectivity and steam stability when heat activated and containing a mixture of raw hydrated kaolin clay and a zeolite component having substantially the X-ray diffraction pattern of ammonium zeolite Y having a silica-to-alumina molar ratio in excess of 4, and analyzing, on a volatile free weight basis, $Na_2O$ in amount within the range of 0.1 percent to 3 percent by weight and the balance substantially $SiO_2$ and $Al_2O_3$ in a weight ratio within the range of 1.1 to 1.3 parts by weight $SiO_2$ per part by weight $Al_2O_3$.

4. The product of claim 3 in the form of ⅛ mesh (Tyler) cylindrical pellets which have a hardness of at least 95 percent when tested by a ball mill attrition test for one hour and a density within the range of 0.8 to 1.0 kg./l. after being heat activated.

5. A cracking catalyst obtained by exchanging sodium ions in the base material of claim 1 with ammonium ions and heat activating said exchanged base material, said catalyst having a density within the range of 0.8 to 1.0 kg./l. and being characterized by high catalytic activity, selectivity and steam stability, said catalyst analyzing $Na_2O$ in amount within the range of 0.1 percent to 3 percent by weight and the balance substantially $SiO_2$ and $Al_2O_3$ in a $SiO_2$ to $Al_2O_3$ weight ratio within the range of 1.1 to 1.3 to 1, said catalyst being further characterized by possessing X-ray diffraction peaks substantially as follows:

| "d" Spacing, A.: | Line intensity |
|---|---|
| 14 | Very strong |
| 8.6 | Medium |
| 7.3 | Do |
| 5.6 | Strong |
| 3.7 | Medium. |

6. The catalyst of claim 5 which has the following chemical analysis on a volatile free weight basis:

| | Percent |
|---|---|
| $Na_2O$ | 0.4 to 2.5 |
| $Fe_2O_3$ | <0.5 |
| $Al_2O_3$ | 43 to 46 |
| $SiO_2$ | 51 to 55 |
| $TiO_2$ and alkaline earth oxides | <2.0. |

7. The catalyst of claim 5 which has a $SiO_2$ to $Al_2O_3$ ratio of about 1.17 to 1.

8. The catalyst of claim 5 which is further characterized by operating at a "CAT-D" weight conversion level in excess of 40 percent when steamed with 100 percent steam at temperatures within the range of 1350° F. to 1550° F. for four hours.

9. The catalyst of claim 5 in the form of cylindrical pellets having a hardness in excess of 95 percent when tested by a ball mill attrition test for one hour.

10. The catalyst of claim 5 in which the $Na_2O$ analysis is in excess of 1 percent and does not exceed 2.5 percent.

References Cited

UNITED STATES PATENTS

| | | | |
|---|---|---|---|
| 2,973,327 | 2/1961 | Mitchell et al. | 252—449 |
| 3,119,659 | 1/1964 | Taggart et al. | 23—112 |
| 3,205,037 | 9/1965 | Maher et al. | 23—112 |
| 3,244,643 | 4/1966 | Schwartz | 252—455 |

DANIEL E. WYMAN, *Primary Examiner.*

C. F. DEES, *Assistant Examiner.*